United States Patent [19]

Koide

[11] Patent Number: 5,510,826
[45] Date of Patent: Apr. 23, 1996

[54] OPTICAL SCANNING APPARATUS

[75] Inventor: Jun Koide, Tokyo, Japan

[73] Assignee: Canon Kabushiki Kaisha, Tokyo, Japan

[21] Appl. No.: 76,786

[22] Filed: Jun. 15, 1993

[30] Foreign Application Priority Data

Jun. 19, 1992 [JP] Japan ................... 4-186187

[51] Int. Cl.$^6$ .................................. B41J 15/16
[52] U.S. Cl. .................. 347/256; 359/206; 359/216
[58] Field of Search ................ 346/1.1, 107 R, 346/108, 76 L, 160; 359/206, 216; 347/256, 241

[56] References Cited

U.S. PATENT DOCUMENTS 4,253,724  3/1981  Minoura et al. ................ 350/6.8
4,554,561  11/1985  Daniele et al. ................ 346/108
5,161,047  11/1992  Tomita et al. ................ 346/108

*Primary Examiner*—Mark J. Reinhart
*Attorney, Agent, or Firm*—Fitzpatrick, Cella, Harper & Scinto

[57] ABSTRACT

In an optical scanning apparatus, a light beam emitted from a light source is collimated and is incident on a reflecting surface of a deflector via stop member. The deflector deflectively reflects the light beam to be directed to a surface to be scanned. The light beam deflectively reflected by the deflector is converged on the surface to be scanned by an optical system. The stop member has an aperture which is constructed such that a circular shape aperture and a slit-like shape aperture are combined. The width of the slit-like shape aperture is arranged in a sub-scanning direction while the circular portion of the circular shape aperture is arranged in a main scanning direction.

16 Claims, 3 Drawing Sheets

OPTICAL SCANNING APPARATUS

BACKGROUND OF THE INVENTION

1. Field of the Invention

The present invention relates to an optical scanning apparatus and, more particularly, to an optical scanning apparatus suitable for an apparatus such as a laser beam, color laser beam, or multicolor laser beam printer having, e.g., an electrophotographic process for optically scanning the scanning surface of an image carrier such as a photosensitive or electrostatic recording body with a modulated laser beam from a laser source.

2. Related Background Art

In a conventional optical scanning apparatus such as a laser beam printer, the surface of the image carrier is optically scanned with a modulated laser beam to write image information, and the like.

FIG. 1 is a schematic view showing the main part of a conventional optical scanning apparatus.

Referring to FIG. 1, a beam emitted from a light source 101 such as a semiconductor laser is collimated by a collimator lens 102 to obtain a parallel beam. The parallel beam is focused through a stop 103 by a cylindrical lens 104 having a refracting power in only a sub-scanning direction and is linearly incident on a deflecting reflection surface 105a of an optical deflector 105 comprising a rotary polygon mirror or the like.

A beam reflected and deflected by the deflecting reflection mirror is guided to a scanning surface 107 through a scanning lens 106 to form a spot thereon. When the optical deflector 105 is rotated about a rotating shaft 105c by a driving means (not shown) such as a motor in a direction indicated by an arrow 105b, the scanning surface 107 is optically scanned in a direction indicated by an arrow 107a.

The stop 103 adjusts the spot shape of the beam on the scanning surface 107. The aperture of the stop 103 generally has a circular, elliptical, or rectangular shape.

In a conventional optical scanning apparatus in a laser beam printer or a laser beam copying machine, a semiconductor laser or an He—Ne laser is used as a light source. The optical amplitude intensity distribution of the laser beam emitted from such a laser source is a Gaussian distribution. In the conventional optical scanning apparatus, the laser beam having this Gaussian distribution is utilized to guide the beam on the image carrier surface through a collimator lens and a stop, thereby optically scanning this surface.

In the optical scanning apparatus shown in FIG. 1, when a stop having a circular or elliptical aperture is used, the optical amplitude distribution of a diffracted pattern of the beam passing through the stop becomes a Bessel distribution. The light intensity distribution of the beam upon optical scanning of the image carrier surface by the scanning lens becomes a conjugate product of the Bessel distribution by a Fourier transform operation. When the light intensity distribution of a beam incident on the stop is a Gaussian distribution, the light intensity distribution of the beam upon optical scanning of the image carrier becomes a Gaussian distribution.

Ideally when the light intensity distribution on the image carrier is a Bessel distribution, the beam spot diameter (i.e., a width at which the light intensity is decreased to $1/e^2$ with respect to a peak of 1) is minimized. That is, high-precision optical scanning can be performed.

In general, as part of the beam, however, is cut by the edge portion of the stop and a point at which the laser beam has a Gaussian light intensity distribution, the light intensity distribution of the beam on the image carrier surface becomes a state between the Bessel distribution and the Gaussian distribution.

When a stop having a rectangular aperture (including a square aperture) is used, diffracted light components are obtained in directions perpendicular to the sides of the stop, and a diffracted pattern becomes a sinc-functional distribution. In this case, the spot diameter becomes smaller than that of the Bessel distribution, but the light intensity of a side lobe increases.

The light intensity distribution of the beam becomes a multi-spot distribution or noise occurs in image formation by optical scanning.

When the stop having a rectangular aperture is used, the aperture of the collimator lens must match the diagonal length. For this reason, the aperture of the collimator lens tends to increase as compared with an arrangement using a stop having a circular or elliptical aperture.

SUMMARY OF THE INVENTION

It is an object of the present invention to provide an optical scanning apparatus using a stop having a shape as a combination of slit-like and circular apertures to reduce the light intensity of a side lobe and obtain a small spot diameter of a laser beam from a laser source, thereby easily obtaining a high-quality image almost free from noise.

An optical scanning apparatus according to the present invention is characterized in that an aperture shape of a stop member is a combination of slit-like and circular apertures when a modulated beam from light source means is collimated by a collimator lens into a parallel beam, the parallel beam is incident on a stop member, the beam passing through an aperture of the stop member is deflected by an optical deflector, and the deflected beam is guided to an image carrier surface by a focusing optical system and optically scanned.

DESCRIPTION OF THE PREFERRED EMBODIMENTS

Figure 1:
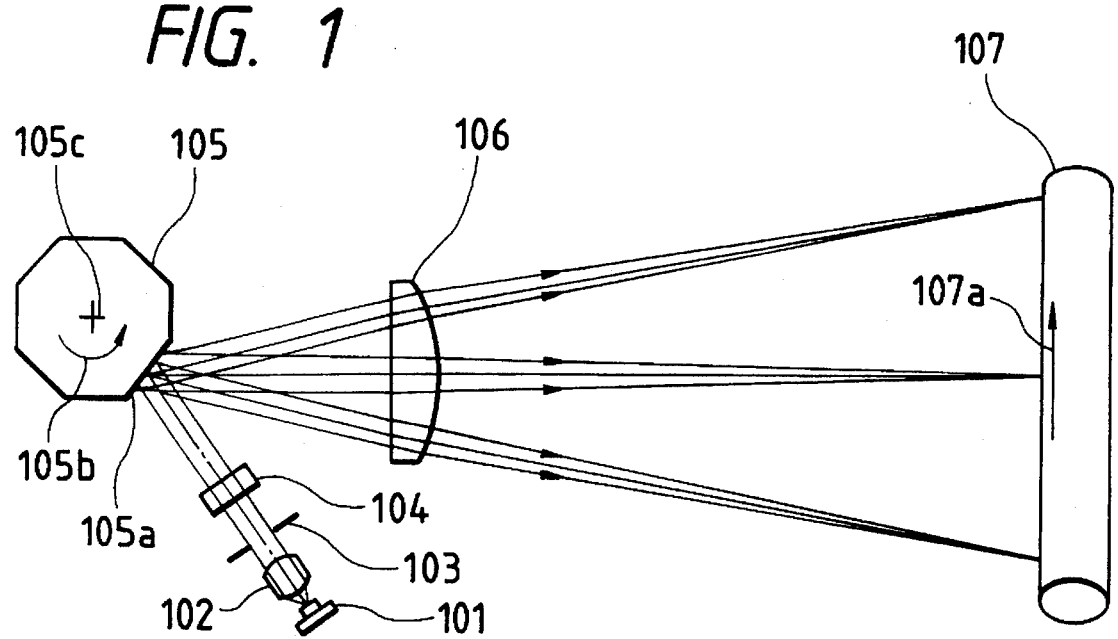
FIG. 1 is a schematic view showing the main part of a conventional optical scanning apparatus.
Figure 2:
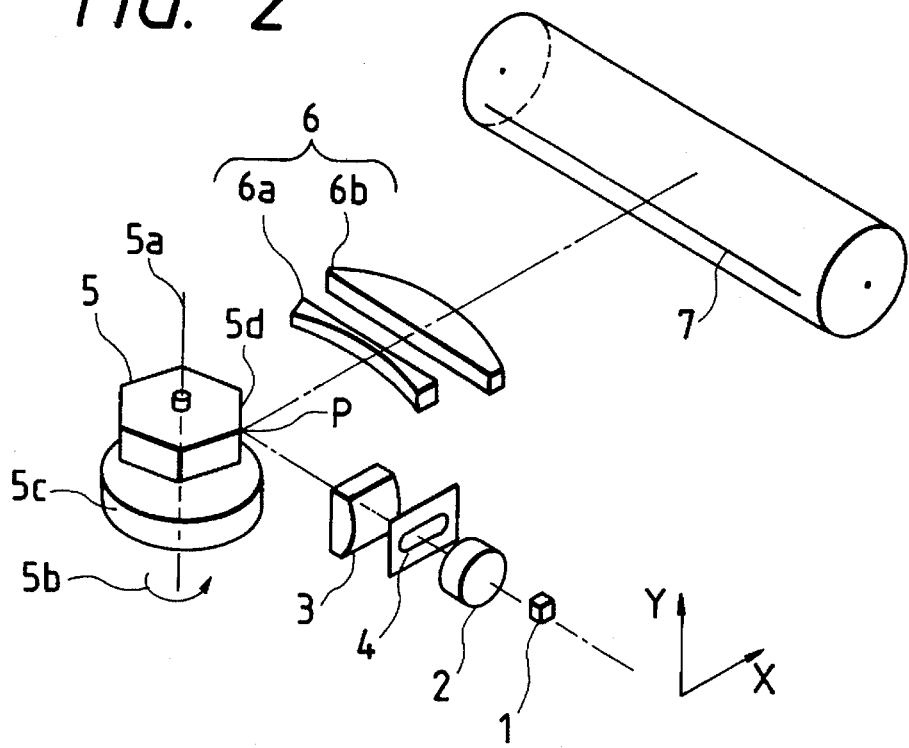
FIG. 2 is a schematic view showing the main part of an optical scanning apparatus according to Embodiment 1 of the present invention.
Figure 3:
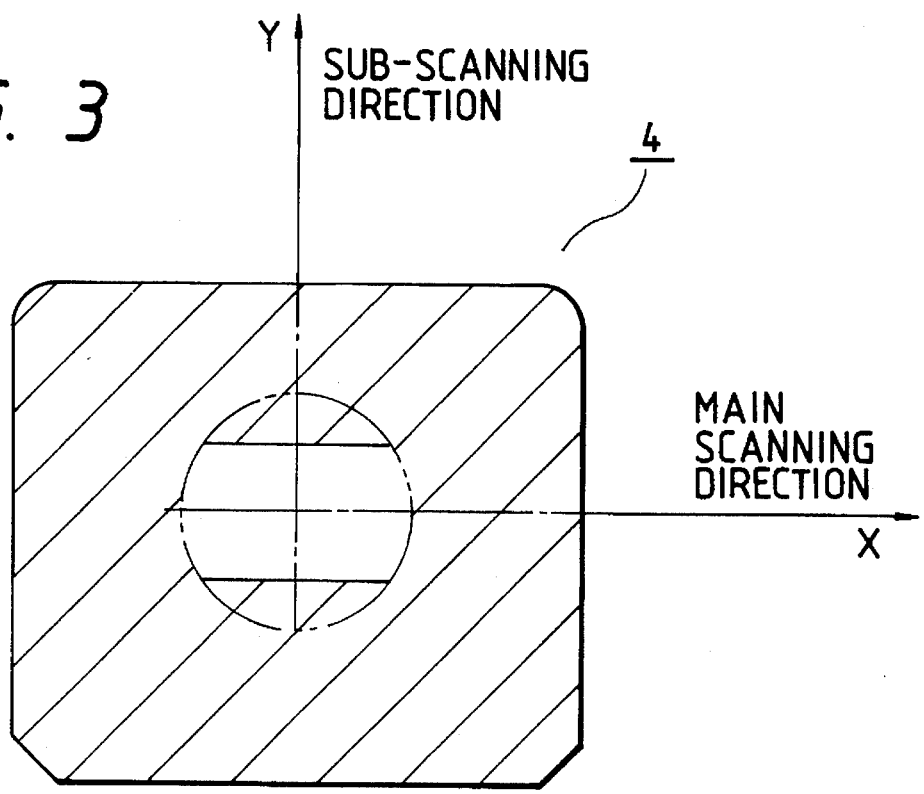
FIG. 3 is a view for explaining a stop member in the apparatus shown in FIG. 2.

FIG. 2 is a schematic view showing the main part of an optical scanning apparatus according to Embodiment 1 of the present invention, and FIG. 3 is a view for explaining part of FIG. 2.

Referring to FIGS. 2 and 3, a light source means 1 comprises, e.g., a semiconductor laser. A collimator lens 2 collimates the beam from the light source means 1 into a parallel beam. A cylindrical lens 3 does not have a refracting power on a main scanning section on which the beam is deflected and scanned, but has a predetermined refracting power on a sub-scanning section including an optical axis and extending in a direction perpendicular to the main scanning section. A stop member 4 adjusts the diameter of a beam passing therethrough, and outputs the beam.

An optical deflector 5 comprises, e.g., a rotary polygon mirror serving as a deflecting means. The optical deflector 5 is rotated about a shaft 5a by a motor 5c in a direction indicated by an arrow 5b. A focusing optical system 6 has a toric lens 6a and a focusing lens 6b to constitute an f-θ system. A photosensitive drum 7 serves as a recording medium serving as a scanning surface. The stop member 4 has a shape as a combination of slit-like and circular apertures, as shown in FIG. 3.

The direction of the short sides of the rectangular aperture is aligned with the sub-scanning direction. The entire aperture shape of the stop member 4 is given such that the sub-scanning direction (Y direction) of the circular aperture is shielded by the rectangular aperture elongated in the main scanning direction (X direction).

More specifically, the direction of slit width of the stop member is aligned with the sub-scanning direction, while the direction of the circular portion is aligned with the main scanning direction.

In this embodiment, a beam modulated on the basis of image information and emitted from the light source means 1 is collimated by the collimator lens 2 into a substantially parallel beam. The diameter of the parallel beam is changed by the aperture of the stop member 4. The parallel beam emerges from the main scanning section of the cylindrical lens 3 as a substantially parallel beam and is focused by the sub-scanning section of the cylindrical lens 3, so that the beam is linearly focused on a deflecting reflection surface 5d of the optical deflector. The linear beam is deflectively reflected by the deflecting reflection surface 5d.

The beam deflectively reflected by the optical deflector 5 passes through the focusing optical system 6, so that scanning linearity of the beam is corrected. The resultant beams is focused on the photosensitive drum 7 to optically scan the surface of the photosensitive drum 7 with an almost constant-speed linear motion.

The optical deflector or rotary polygon mirror 5 is rotated by the motor 5c at a constant speed, so that a spot emitted from the light source means 1 and focused on the photosensitive drum 7 is scanned in the main scanning direction. The photosensitive drum 7 is rotated about its axis to perform sub-scanning. In this manner, a latent image is formed on the surface of the photosensitive drum 7. A corona discharger (not shown) for uniformly charging the surface of the photosensitive drum 7, a developing unit (not shown) for visualizing the latent image formed on the surface of the photosensitive drum 7 into a toner image, a transfer corona discharger (not shown) for transferring the toner image onto recording paper, and the like are arranged around the photosensitive drum 7. By the functions of these constituent components, recording information corresponding to the beam emitted from the light source means 1 is printed on the recording paper.

Referring to FIG. 2, the deflecting reflection surface 5d has a reflecting surface position P. The light beam is incident at almost this reflecting surface position P on the sub-scanning section.

The reflecting surface position P and the photosensitive drum 7 are optically conjugate to each other with respect to the focusing optical system 6. Even if the deflecting reflection surface is inclined on the sub-scanning section, i.e., even if so-called plane inclination occurs, the light beam is focused on the same scanning line on the photosensitive drum 7. In this embodiment, plane inclination of the optical deflector 5 is corrected as described above.

Figure 4:
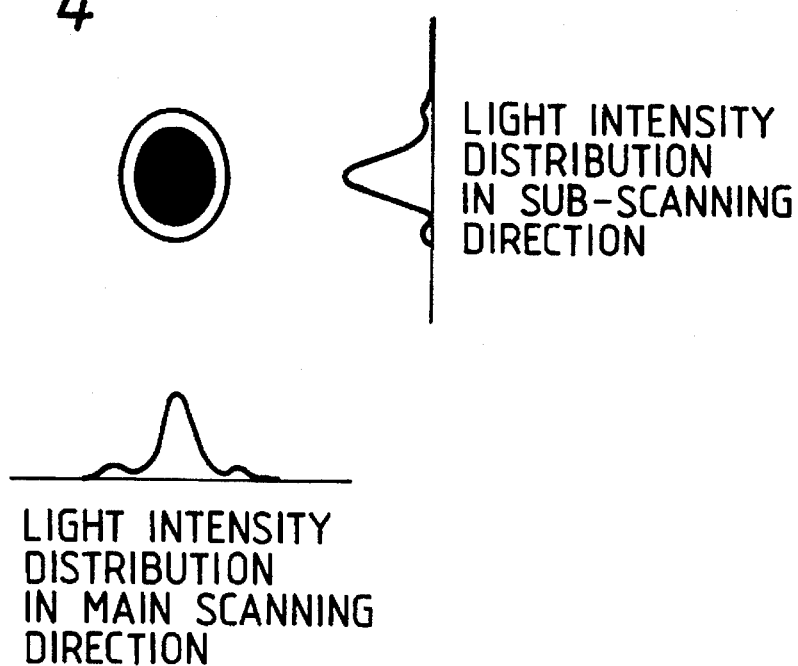
FIG. 4 is a view for explaining the shape of a spot on a scanning surface when a conventional stop having a circular aperture is used.

FIG. 4 shows the spot diameter and the light intensity distributions in the main scanning and sub-scanning directions on the photosensitive drum when one stop having a circular aperture is used as the stop member.

Figure 5:
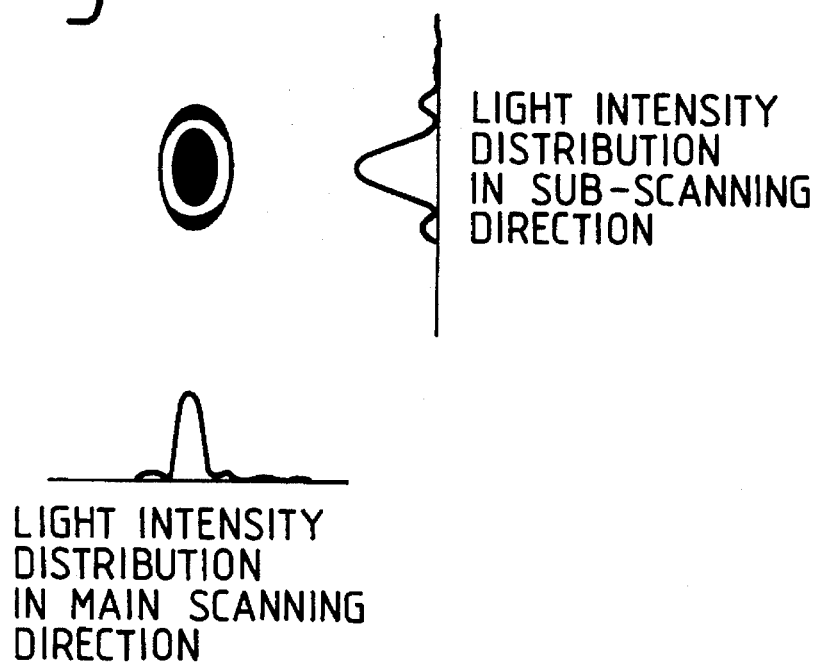
FIG. 5 is a view for explaining the shape of a spot on a scanning surface when the stop member according to the present invention is used.

FIG. 5 shows the spot diameter and the light intensity distributions in the main scanning and sub-scanning directions on the photosensitive drum when the stop member 4 in FIG. 3 of the present invention is used.

In this embodiment, as shown in FIG. 5, since the stop member 4 as described above is used, the light intensity distribution of the focused light is optimized, and the spot diameter of the beam optically scanned on the photosensitive drum 7 can be reduced. Therefore, the side lobe is suppressed to have a low intensity, and a high-precision image can be formed.

Figure 6:
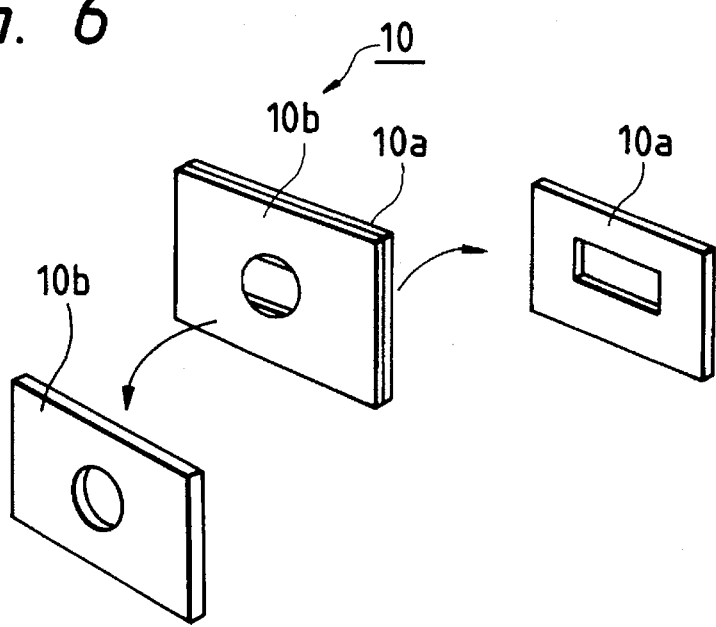
FIG. 6 is a view for explaining a stop member constituted by two members.

As shown in FIG. 6, a stop member 10 may be constituted using a stop plate 10b having a circular aperture and a stop plate 10a having a slit-like aperture. In this case, these two stop plates are preferably in tight contact with each other. However, when an incident laser beam is a parallel beam, the distance between the stop plates can be arbitrarily determined. When this stop member 10 constituted by the two stop plates is used, the aperture member need not be processed by etching or wire cutting. The cost of the stop member can be reduced.

As described above, the optical scanning apparatus according to the present invention is characterized in that the aperture shape of a stop member is a combination of slit-like and circular apertures when a modulated beam from light source means is collimated by a collimator lens into a parallel beam, the parallel beam is incident on a stop member, the beam passing through an aperture of the stop member is deflected by an optical deflector, and the deflected beam is guided to an image carrier surface by a focusing optical system and optically scanned.

As has been described above, according to the present invention, the stop having a shape as a combination of slit-like and circular apertures is used to reduce the light intensity of the side lobe of the laser beam from the laser source and at the same time reduce the spot diameter, thereby realizing an optical scanning apparatus which can facilitate formation of a high-quality image almost free from noise.

What is claimed is:

1. An optical scanning apparatus comprising:

light source means;

a collimating optical system for collimating a beam from said light source means into a parallel beam;

an optical deflector for deflecting the beam from said collimating optical system;

a stop member arranged between said collimating optical system and said optical deflector and having a shape as a combination of slit-like and circular apertures; and an optical system for focusing the beam deflected by said optical deflector.

2. An apparatus according to claim 1, wherein said stop member is arranged such that a direction of slit width is aligned with a sub-scanning direction and a direction of a circular portion is aligned with a main scanning direction.

3. An apparatus according to claim 1, wherein said stop member comprises two members respectively having a circular aperture and a slit-like aperture.

4. An optical scanning apparatus comprising:

light source means;

an optical deflector for deflecting the beam from said light source means;

a stop member arranged between said light source means and said optical deflector and having a shape as a combination of slit-like and circular apertures; and an optical system for focusing the beam deflected by said optical deflector.

5. An apparatus according to claim 4, wherein said stop member is arranged such that a direction of slit width is aligned with a sub-scanning direction and a direction of a circular portion is aligned with a main scanning direction.

6. An apparatus according to claim 4, wherein said stop member comprises two members respectively having a circular aperture and a slit-like aperture.

7. A laser beam printer comprising:

light source means;

a collimating optical system for collimating a beam from said light source means into a parallel beam;

an optical deflector for deflecting the beam from said collimating optical system;

a stop member arranged between said collimating optical system and said optical deflector and having a shape as a combination of slit-like and circular apertures;

a recording medium; and an optical system for focusing the beam deflected by said optical deflector on said recording medium.

8. A printer according to claim 7, wherein said stop member is arranged such that a direction of slit width is aligned with a sub-scanning direction and a direction of a circular portion is aligned with a main scanning direction.

9. A printer according to claim 7, wherein said stop member comprises two members respectively having a circular aperture and a slit-like aperture.

10. A laser beam printer comprising:

light source means;

an optical deflector for deflecting the beam from said light source means;

a stop member arranged between said light source means and said optical deflector and having a shape as a combination of slit-like and circular apertures;

a recording medium; and an optical system for focusing the beam deflected by said optical deflector on said recording medium.

11. A printer according to claim 10, wherein said stop member is arranged such that a direction of slit width is aligned with a sub-scanning direction and a direction of a circular portion is aligned with a main scanning direction.

12. A printer according to claim 10, wherein said stop member comprises two members respectively having a circular aperture and a slit-like aperture.

13. An optical scanning apparatus according to claim 1, wherein said stop member reduces a spot diameter of the light beam focused by said optical system so as to suppress a side lobe thereof to a low intensity.

14. An optical scanning apparatus according to claim 4, wherein said stop member reduces a spot diameter of the light beam focused by said optical system so as to suppress a side lobe thereof to a low intensity.

15. A laser beam printer according to claim 7, wherein said stop member reduces a spot diameter of the light beam focused by said optical system so as to suppress a side lobe thereof to a low intensity.

16. A laser beam printer according to claim 10, wherein said stop member reduces a spot diameter of the light beam focused by said optical system so as to suppress a side lobe thereof to a low intensity.

* * * * *